(12) United States Patent
Chen et al.

(10) Patent No.: US 11,331,723 B2
(45) Date of Patent: May 17, 2022

(54) LIGHT METAL JOINING METHOD AND JOINT FILLER FOR SAME

(71) Applicant: Metal Industries Research & Development Centre, Kaohsiung (TW)

(72) Inventors: Hung-Tao Chen, Kaohsiung (TW); Chang-Shu Kuo, Tainan (TW); In-Gann Chen, Tainan (TW); Steve Lien-Chung Hsu, Tainan (TW); Chi-Wah Keong, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 791 days.

(21) Appl. No.: 15/962,182

(22) Filed: Apr. 25, 2018

(65) Prior Publication Data
US 2019/0134714 A1 May 9, 2019

(30) Foreign Application Priority Data

Nov. 7, 2017 (TW) ................................ 106138449

(51) Int. Cl.
*B22F 7/06* (2006.01)
*B22F 1/00* (2022.01)
(Continued)

(52) U.S. Cl.
CPC ............ *B22F 7/064* (2013.01); *B22F 1/0014* (2013.01); *B22F 1/0018* (2013.01); *B22F 3/14* (2013.01);
(Continued)

(58) Field of Classification Search
CPC .......... B22F 2301/052; B22F 2301/255; B22F 2304/10; B22F 2304/054; B22F 2304/056;
(Continued)

(56) References Cited

U.S. PATENT DOCUMENTS

| 2004/0222206 A1* | 11/2004 | Nagase | ..................... B22F 7/08 |
| | | | 219/229 |
| 2015/0069638 A1* | 3/2015 | Hiratsuka | ............. C22C 1/0491 |
| | | | 257/784 |

FOREIGN PATENT DOCUMENTS

| CN | 101047048 A | * 10/2007 | ............... H01B 1/22 |
| CN | 101974303 A | * 2/2011 | |
| | (Continued) | | |

OTHER PUBLICATIONS

JP-2010234401-A English language translation (Year: 2010).*

(Continued)

*Primary Examiner* — Anthony J Zimmer
*Assistant Examiner* — Sean P. O'Keefe
(74) *Attorney, Agent, or Firm* — Juan Carlos A. Marguez; Marquez IP Law Office, PLLC

(57) ABSTRACT

A light metal joint filler is provided. The light metal joint filler is formed by uniformly mixing a solvent with a light metal powder and a silver powder, where a powder particle size of the light metal powder is on a micron scale, and a powder particle size of the silver powder is on a nanometer scale or a submicron scale. A metal joining method of the present disclosure includes: coating a joint of two to-be-joined light metal pieces with the light metal joint filler; and hot pressing the two to-be-joined light metal pieces, so that the silver powder is sintered and bonded with the light metal powder and surfaces of the two to-be-joined light metal pieces, and completing joining of the two to-be-joined light metal pieces after the silver powder is condensed.

6 Claims, 4 Drawing Sheets

(51) Int. Cl.
  *B22F 3/14*   (2006.01)
  *B23K 35/28*  (2006.01)
  *B22F 3/15*   (2006.01)
(52) U.S. Cl.
  CPC .............. *B22F 3/15* (2013.01); *B23K 35/286* (2013.01); *B22F 2201/20* (2013.01); *B22F 2301/052* (2013.01); *B22F 2301/255* (2013.01); *B22F 2304/054* (2013.01); *B22F 2304/056* (2013.01); *B22F 2304/058* (2013.01); *B22F 2304/10* (2013.01)
(58) Field of Classification Search
  CPC .... B22F 2301/05–058; B23K 35/3006; B23K 35/286; B23K 35/284
  See application file for complete search history.

(56) References Cited

FOREIGN PATENT DOCUMENTS

CN    105679410 A  *  6/2016
JP    2010234401 A  *  1/2010

OTHER PUBLICATIONS

Roberts, Philip. (2013). Industrial Brazing Practice (2nd Edition)—9.4 Brazing Filler Materials. Taylor & Francis. (Year: 2013).*

* cited by examiner

LIGHT METAL JOINING METHOD AND JOINT FILLER FOR SAME

BACKGROUND

Technical Field

The present invention relates to a metal joining method and a joint filler for same, and in particular, to a light metal joining method for low-temperature joining and a joint filler for same.

Related Art

Currently, a joint filler of a light metal such as an aluminum alloy may include a brazing filler and a nano-silver paste.

The brazing filler needs to be used to perform metal joining in a vacuum condition or a protection atmosphere at a joining temperature between 580° C. and 600° C. Costs of the brazing materials (0.5 NTD/g to 1.5 NTD/g) are low. However, the joining temperature is high, which easily leads to deformation of a joining metal piece and increases costs of reforming after brazing. In addition, the joining temperature is quite near a melting point of a base metal, so the requirement on process precision is high.

The nano-silver paste may function in an environment of an atmospheric pressure at a joining temperature lower than 300° C., but costs of the nano-silver paste (higher than 100 NTD/g) are high. This limits the use of the nano-silver paste.

SUMMARY

A main problem to be resolved by the present invention is that, currently, a brazing filler and a nano-silver paste used as a joint filler of a light metal respectively have problems of metal piece deformation in high-temperature joining and high costs. The present invention provides a metal joint filler that reduces costs and that can perform low-temperature joining.

To achieve the foregoing objective, the present invention discloses a light metal joint filler. The light metal joint filler is formed by uniformly mixing a solvent with a light metal powder and a silver powder, where a powder particle size of the light metal powder is micron-scale, a powder particle size of the silver powder is nanoscale or submicron-scale, and a density of the metal powders is lower than 5 g/cm$^3$.

In an embodiment, the particle size of the silver powder is between 10 nm and 500 nm.

In an embodiment, the particle size of the light metal powder is between 5 μm and 500 μm.

In an embodiment, the silver powder has a weight ratio of 2 wt % to 50 wt %, and the light metal powder has a weight ratio of 50 wt % to 98 wt %.

In an embodiment, the light metal powder is an aluminum powder.

In the foregoing embodiment, the particle size of the aluminum powder is between 5 μm and 500 μm.

In the foregoing embodiments, the silver powder has a weight ratio of 2 wt % to 50 wt %, and the aluminum powder has a weight ratio of 50 wt % to 98 wt %.

The present invention further discloses a metal joining method, including: coating a joint of two to-be-joined light metal pieces with any light metal joint filler described above; and hot pressing the two to-be-joined light metal pieces, so that the silver powder is sintered and bonded with the light metal powder and surfaces of the two to-be-joined light metal pieces, and completing joining of the two to-be-joined light metal pieces after the silver powder is condensed.

In an embodiment, heating at a low temperature refers to a heating manner of 200 degrees Celsius to 400 degrees Celsius.

In an embodiment, a pressurizing apparatus applies 2 MPa to 10 MPa of joining pressure on the to-be-joined light metals in vacuum or under an atmospheric pressure.

By using the metal joining method and the joint filler for same of the present invention, metal joining may be performed in an environment of a normal atmospheric pressure by heating at a low temperature, thereby preventing a metal piece from deformation in high-temperature joining. In addition, costs of a filler of low-temperature joining are reduced by controlling the component proportion.

DETAILED DESCRIPTION

A main problem to be resolved by the present invention is that, currently, a brazing filler and a nano-silver paste used as a joint filler of a light metal respectively have problems of metal piece deformation in high-temperature joining and high costs. The present invention provides a metal joint filler that reduces costs and that can perform low-temperature joining.

Figure 1:
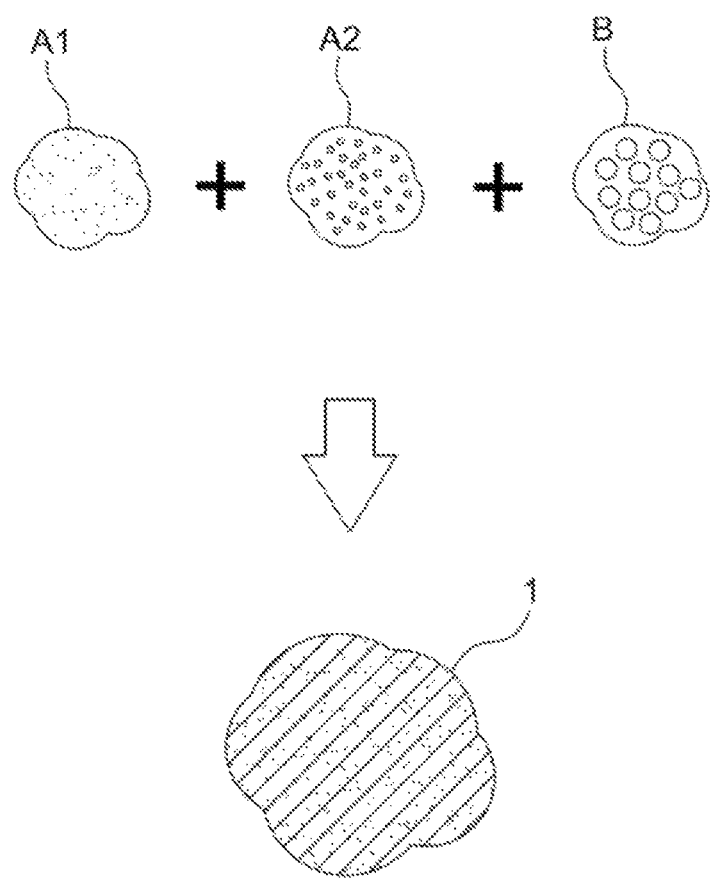
FIG. 1 is a schematic diagram of components of a metal joint filler according to the present invention.

To resolve the foregoing problem, the present invention provides a metal joint filler 1 that is applied to joining metal pieces. As shown in FIG. 1, components of the metal joint filler 1 include a silver powder A1, a light metal powder A2, and a solvent B. The solvent B is uniformly mix with the light metal powder A2 and the silver powder A1. A particle size of silver particles of the silver powder A1 is nanoscale or submicron-scale. A particle size of light metal particles of the light metal powder A2 is micron-scale. A density of the light metal powders is lower than 5 g/cm$^3$.

In an embodiment, the particle size of the silver powder A1 is between 10 nm and 500 nm.

In an embodiment, the particle size of the light metal powder A2 is between 5 μm and 500 μm.

In an embodiment, the silver powder A1 has a weight ratio of 2 wt % to 50 wt %, and the light metal powder A2 has a weight ratio of 50 wt % to 98 wt %.

In an embodiment, the light metal powder A2 is an aluminum powder.

In the foregoing embodiment, the particle size of the aluminum powder is between 5 μm and 500 μm.

In the foregoing embodiments, the silver powder A1 has a weight ratio of 2 wt % to 50 wt %, and the aluminum powder has a weight ratio of 50 wt % to 98 wt %.

That is, the present invention provides a metal joint filler 1 of low operation temperature. The metal joint filler 1 is formed by a silver powder A1, a light metal powder A2 (for example, an aluminum powder), and a solvent B. A particle size of the silver powder A1 is between 10 nm and 500 nm, and a ratio thereof is between 2 wt % and 50 wt %. A particle size of the light metal powder A2 is between 5 μm and 500 μm, and a ratio thereof is between 50 wt %-98 wt %. The solvent B may be alcohol, and especially may be a multi-carbon number compound, for example, terpineol. The solvent B enables the silver powder A1 and the light metal powder A2 to be uniformly mixed.

Figure 2A:
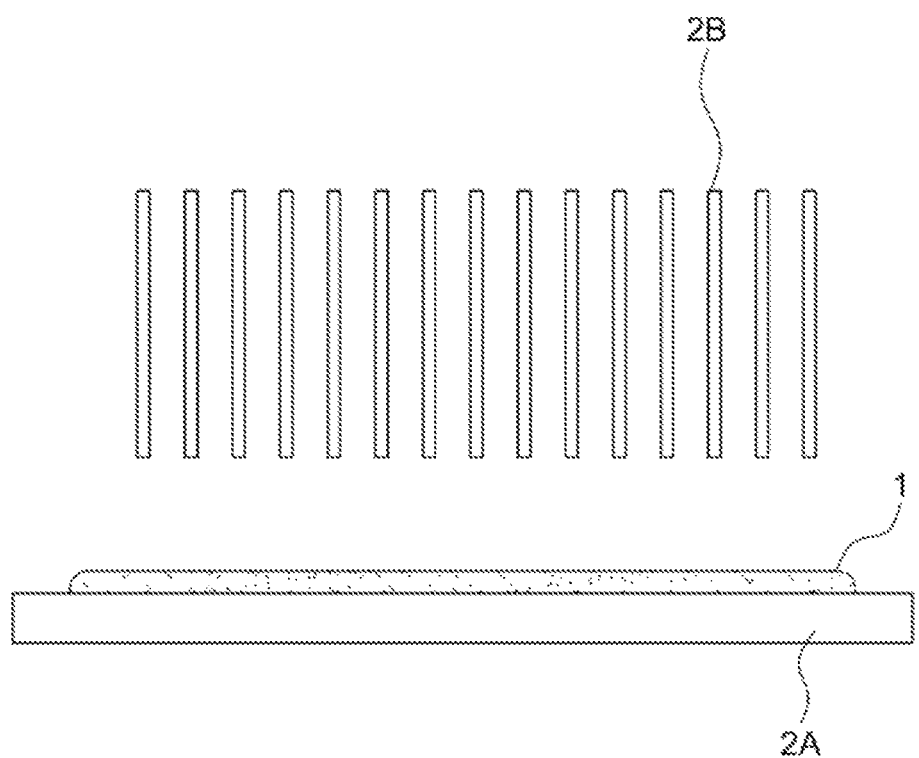
FIG. 2A and FIG. 2B are schematic diagrams of applying a metal joint filler according to the present invention.
Figure 2B:
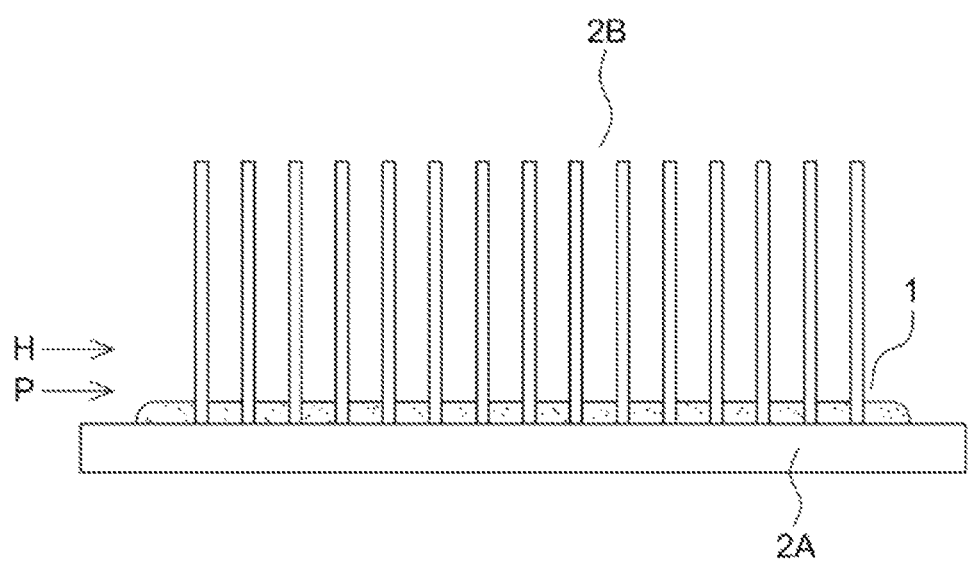

Still referring to FIG. 2A and FIG. 2B, FIG. 2A and FIG. 2B are schematic diagrams of applying a metal joint filler according to the present invention. As shown in the figures, the present invention is applicable to metal joining of a non-structural part made of a light metal, for example, joining between a first metal piece 2A (for example, an aluminum alloy heat-dissipation base plate shown in the figure) and a second metal piece 2B (for example, aluminum alloy heat-dissipation fins).

When metal piece joining is performed by using the metal joint filler 1 of the present invention, first, as shown in FIG. 2A, a joint where the first metal piece 2A (the aluminum alloy heat-dissipation base plate) and the second metal piece 2B (the aluminum alloy heat-dissipation fins) is to join is coated with the metal joint filler 1. Subsequently, when the first metal piece 2A is joined with the second metal piece 2B, an environment of heating H at a low temperature and pressurizing P is provided.

In this embodiment, low-temperature heating of 200 degrees Celsius to 400 degrees Celsius is performed, and a pressure of 2 MPa to 10 MPa is applied.

That is, in metal joining by using the metal joint filler 1 provided by the present invention, hot pressing is performed on two to-be-joined metal pieces (the first metal piece 2A and the second metal piece 2B) by processes of heating H and pressurizing P. After the solvent B in the metal joint filler 1 is vaporized, the nanoscale or micron-scale silver powder A1 reaches a melting point and the surface thereof melts, there by bonding with the light metal powder A2 and the to-be-joined metal pieces (the first metal piece 2A and the second metal piece 2B). The light metal powder A2 still remains in a solid state, and voids in the metal powder are eliminated. After being cooled, the silver metal freezes and joins the two to-be-joined metal pieces. In this way, desired metal joining with desired shear strength is formed between the two to-be-joined metal pieces. Experimental data is shown in the following Table 1:

TABLE 1

| Silver powder A1 | | Light metal powder A2 | | | | |
|---|---|---|---|---|---|---|
| Content (wt %) | Particle size (nm) | Content (wt %) | Particle size (µm) | Joining temperature (° C.) | Joining pressure (MPa) | Shear strength (MPa) |
| 5 | 20 | 95 | 5 | 400 | 10 | 5.6 |
|   |    |    |   | 300 |    | 1.9 |
| 6 | 20 | 94 | 200 | 400 |  | 12.7 |
|   |    |    |   | 300 |    | 5.0 |
| 5 | 400 | 95 | 5 | 400 |  | 6.5 |
|   |    |    |   | 300 |    | 3.3 |
| 5 | 400 | 95 | 200 | 400 |  | 5.6 |
|   |    |    |   | 300 |    | 2.2 |

Figure 3:
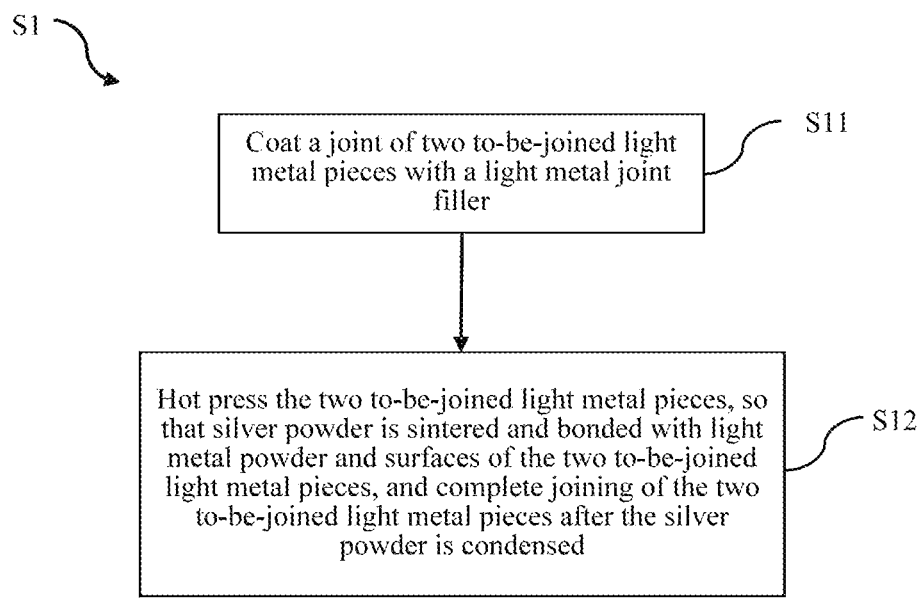
FIG. 3 is a flowchart of steps of a metal joining method according to the present invention.

That is, the present invention further discloses a metal joining method S1. As shown in FIG. 3, the metal joining method includes:

step S11: Coat a joint of two to-be-joined light metal pieces with a light metal joint filler; and step S12: Hot press the two to-be-joined light metal pieces, so that the silver powder is sintered and bonded with the light metal powder and surfaces of the two to-be-joined light metal pieces, and complete joining of the two to-be-joined light metal pieces after the silver powder is condensed.

Compared with a brazing process, in the present invention, operation can be performed at a lower joining temperature. Using aluminum alloy as an example, the joining temperature (200° C. to 400° C.) of the present invention is lower than the temperature (greater than 580° C.) of a conventional aluminum alloy brazing process. This saves process costs and reforming costs of a brazed workpiece. The joining temperature is 200° C. lower than a melting point of a base metal, and the joining does not need to be performed in a vacuum environment. The requirement on process precision is low and the equipment investment is reduced. Compared with a process of a nano-silver paste, in the present invention, because the aluminum powder is mixed, costs of required materials (approximately 5 NTD/g) are much lower than costs of a full nano-silver metal paste (greater than 100 NTD/g).

In conclusion, the metal joining method and the joint filler disclosed by the present invention may be used in metal joining in an environment of a normal atmospheric pressure by heating at a low temperature, thereby preventing a metal piece from deformation in high-temperature joining. In addition, costs of a filler of low-temperature joining are reduced by controlling the component proportion.

The foregoing implementations or embodiments of the technical means used by the present invention are not used to limit the implementation scope of the present invention. Equivalent change and modification that is consistent with application content of the present invention or according to the patent scope of the present invention shall fall with the protection scope of the present invention.

What is claimed is:

1. A light metal joint filler, formed by uniformly mixing a solvent with a light metal powder and a silver powder, wherein:
    a powder particle size of the light metal powder is micron-scale, and a powder particle size of the silver powder is nanoscale or submicron-scale;
    the particle size of the silver powder is between 400 nm and 500 nm;
    the particle size of the light metal powder is between 200 µm and 500 µm; and
    the total weight of the light metal powder and the silver powder comprises:
    a weight fraction of the silver powder that is 2 wt % to 6 wt %, and a weight fraction of the light metal powder that is 94 wt % to 98 wt %.

2. The metal joint filler according to claim 1, wherein the light metal powder is an aluminum powder.

3. A light metal joining method, comprising:
    coating a joint of two to-be-joined light metal pieces with any light metal joint filler according to claim 1; and
    hot pressing the two to-be-joined light metal pieces and heating the two to-be-joined light metal pieces at a pre-determined temperature, so that the silver powder is sintered and bonded with the light metal powder and surfaces of the two to-be-joined light metal pieces, and completing joining of the two to-be-joined light metal pieces after the silver powder is condensed.

4. The metal joining method according to claim 3, wherein the pre-determined temperature is between 200 degrees Celsius and 400 degrees Celsius.

5. The metal joining method according to claim 3, wherein a pressurizing apparatus applies 2 MPa to 10 MPa of joining pressure on the to-be-joined light metals in vacuum or under an atmospheric pressure.

6. The metal joining method according to claim 3, wherein the light metal powder is an aluminum powder.

\* \* \* \* \*